United States Patent
Wu et al.

(10) Patent No.: US 10,060,835 B1
(45) Date of Patent: Aug. 28, 2018

(54) OPTIMIZING HYDRANT SELECTION FOR FLOW TEST OF WATER DISTRIBUTION SYSTEMS

(71) Applicant: Bentley Systems, Incorporated, Exton, PA (US)

(72) Inventors: Zheng Yi Wu, Watertown, CT (US); Yuan Song, Storrs, CT (US)

(73) Assignee: Bentley Systems, Incorporated, Exton, PA (US)

( * ) Notice: Subject to any disclaimer, the term of this patent is extended or adjusted under 35 U.S.C. 154(b) by 312 days.

(21) Appl. No.: 14/808,814

(22) Filed: Jul. 24, 2015

Related U.S. Application Data (60) Provisional application No. 62/043,739, filed on Aug. 29, 2014.

(51) Int. Cl.
  *G01F 1/00* (2006.01)
  *G01M 99/00* (2011.01)
  *E03B 9/02* (2006.01)

(52) U.S. Cl.
  CPC ............ *G01M 99/008* (2013.01); *E03B 9/02* (2013.01); *G01F 1/00* (2013.01)

(58) Field of Classification Search
  CPC ............................. G01M 99/008; E03B 9/02
  See application file for complete search history.

(56) References Cited

U.S. PATENT DOCUMENTS 7,917,324 B2 * 3/2011 Hurley ...................... F17D 5/00
                                                         702/114
2007/0057802 A1 * 3/2007 Fujiwara ................... F16T 1/48
                                                         340/605
2013/0138396 A1 * 5/2013 Hauffen .................. G06F 17/00
                                                         702/181

OTHER PUBLICATIONS

Sage, Paul, et al., "Improved Leakage Detection and Model Calibration Using Night Fire Flow Testing," World Environmental and Water Resources Congress: 2010 Challenges of Change, ASCE, May 2010, pp. 4237-4252.
Shah, Jay B., et al., "Hydrant Flushing: Improved Water Quality," Distribution Systems, Water Engineering and Management, Jun. 2001, pp. 24-25.
U.S. Appl. No. 14/726,189, filed May 29, 2015 by Zheng Yi Wu et al. for Optimizing Water Quality Sensor Placement for Water Distribution Systems, pp. 1-29.
U.S. Appl. No. 14/563,668, filed Dec. 8, 2014 by Zheng Yi Wu et al. for Optimizing Sensor Placement for Structural Health Monitoring, pp. 1-34.

(Continued)

*Primary Examiner* — Matthew G Marini
(74) *Attorney, Agent, or Firm* — Cesari and McKenna, LLP; James A. Blanchette (57) ABSTRACT

In one embodiment, a technique is provided for optimizing selection of hydrants for flow test in a water distribution system. An impact database is built that indicates whether a flow test at each hydrant in the water distribution system has an impact on each pipe of the water distribution system. When a user supplies a number of hydrants to be subject to flow test, a hydrant selection solver application may search for an optimized set of hydrants for flow test that includes the user-supplied number, the searching to include generating candidate sets of hydrants and evaluating the candidate sets of hydrants based on fitness values calculated using the impact database, each fitness value to evaluate performance of a candidate set of hydrants based on flow velocity or hydraulic gradient change in pipes.

14 Claims, 9 Drawing Sheets

(56) References Cited

OTHER PUBLICATIONS

Walski, Thomas, et al., "Advanced Water Distribution Modeling and Management," Haestad Methods, First edition, Haestad Methods, Inc., Jan. 2003, pp. 1-800.

Walski, Thomas M., et al., "Technique for Calibrating Network Models," Journal of Water Resources Planning Management, vol. 109, No. 4, Oct. 1983, pp. 360-372.

Wu, Z. Y., et al., "Darwin Optimization User Manual," Bentley Systems, Incorporated, Sep. 2012, pp. 1-40.

* cited by examiner

● Hydrants Optimized for Flow Test
— Impacted Pipes

FIG. 8

FIG. 9

OPTIMIZING HYDRANT SELECTION FOR FLOW TEST OF WATER DISTRIBUTION SYSTEMS

RELATED APPLICATIONS

The present application claims the benefit of U.S. Provisional Application No. 62/043,739 filed by Zheng Yi Wu et al. on Aug. 29, 2014, titled "Optimizing Hydrant Selection for Flow Test of Water Distribution Systems", the contents of which are incorporated by reference herein in their entirety.

BACKGROUND

Technical Field

The present disclosure relates generally to hydraulic modeling of water distribution systems and more specifically to techniques that may be used with a hydraulic model of a water distribution system to optimize the selection of hydrants for flow test.

Background Information

The primary purpose of the hydrants in a water distribution system is to enable fire fighters to connect fire hoses to provide water for extinguishing fires. Standard practices in the United States typically involve the placement of hydrant every 500 feet, although this spacing may vary based on practical considerations, such as accessibility, obstructions, proximity to buildings and other circumstances. Regardless of the exact spacing, most urban areas have many hundreds, or even many thousands, of hydrants connected to their water distribution systems.

Hydrants may be subject to flow test to ensure their proper operation during an emergency, as well as to provide other benefits. For example, in addition to being used to estimate the available flow from hydrants for fire fighting, flow test may be used to collect pressure data for hydraulic model calibration, leakage hotspot detection, for flushing pipelines to ensure adequate water quality, etc. Due to the number of hydrants in a typical water distribution system, it is generally impracticable to flow test every hydrant in the system. Instead, a selected subset of hydrants is generally tested. Flow test may be used to estimate the available flow from hydrants for fire fighting. In order to maximize the benefits of flow test, some general guidelines are generally followed to manually select the hydrants that are to be tested. For instance, it is usually recommended that flow test be conducted at hydrants located at the outskirts of the water distribution system, and that released flow during the test should result in a significant pressure drop, e.g., at least 10 psi or 70 kPa.

However, with hundreds or even thousands of hydrants to select from, it is not a straightforward task to determine which hydrants should be selected for flow test. General recommendations and rules of thumb do not adequately identify the optimal hydrants to use. While increasing the number of hydrants selected can sometimes compensate for less than ideal selection, more man-hour are required and more water is wasted during the test. Choosing an optimal set of hydrant for test may allow for better estimates of the available flow from hydrants for fire fighting, better quality data to be collected for model calibration, pipes to be better flushed, as well as other benefits, without the shortcomings of simply increasing the number of hydrants subject to test.

However, there is currently not an effective automated technique for optimizing the selection of hydrants for flow test.

SUMMARY

In one embodiment, a hydrant selection solver application determines an optimized set of hydrants for flow test using a two-part technique that include (1) building an impact database, and (2) using the impact database to search for the optimized set of hydrants. The hydrant selection solver application may employ a number of software modules to perform various portions of the technique.

To build the impact database, an impact database generation module may initially generate a plurality of hydrant test events involving hydrants being opened for flow test. A simulation module may simulate each hydrant test event, using a hydraulic model of the water distribution system. From the simulation it is determined whether flow test at a hydrant has an impact on each pipe of the water distribution system. Flow test may be considered to have an impact on a given pipe when an increase in flow velocity in the pipe is greater than or equal to a prescribed minimum velocity change, when hydraulic gradient change in the pipe is greater than or equal to a prescribed minimum hydraulic gradient change, or some other standard is met. The impact database generation module may store indications of the impact on each pipe in the impact database. In one implementation, the indications are stored as binary impact factors and the impact database is arranged to maintain a binary matrix of such factors.

To search for an optimized set of hydrants, a user interface (UI) module may request a user select a number of hydrants to be subject to flow test. A parallel optimization module may generate candidate sets of hydrant for flow test that includes user-supplied number of hydrants. A hydrant flow test evaluation module may receive the candidate sets of hydrants, and calculate a fitness value using the impact database. The fitness values may measure performance achieved by the hydrants of the candidate sets of hydrants based on a number, or a length, of pipes that would experience an increase in flow velocity greater than or equal to a prescribed minimum velocity change, that would experience a change in hydraulic gradient greater than or equal to a prescribed minimum hydraulic gradient change, or that would meet some other standard. The fitness value may be expressed as a ratio of the number, or length, of impacted pipes to the number, or length (as the case may be), of all pipes in the water distribution system. The parallel optimization module (e.g., using a genetic algorithm) may evolve the candidate set of hydrants based on the fitness value, to produce a subsequent candidate set of hydrants for flow test. The process may be iteratively repeated to successively generate better and better candidate sets of hydrants by attempting to maximize the fitness value, until eventually a stopping criteria is reached, and a best candidate sets of hydrants then available is returned as the optimized set of hydrants. The UI module may display the optimized set of hydrants to a user, and using such information the user (or workers under the user's direction) may conduct an actual flow test at the hydrants of the water distribution system indicated in the optimized set.

It should be understood that a variety of additional features and alternative embodiments may be implemented other than those discussed in this Summary. This Summary is intended simply as a brief introduction to the reader for the further description which follows, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
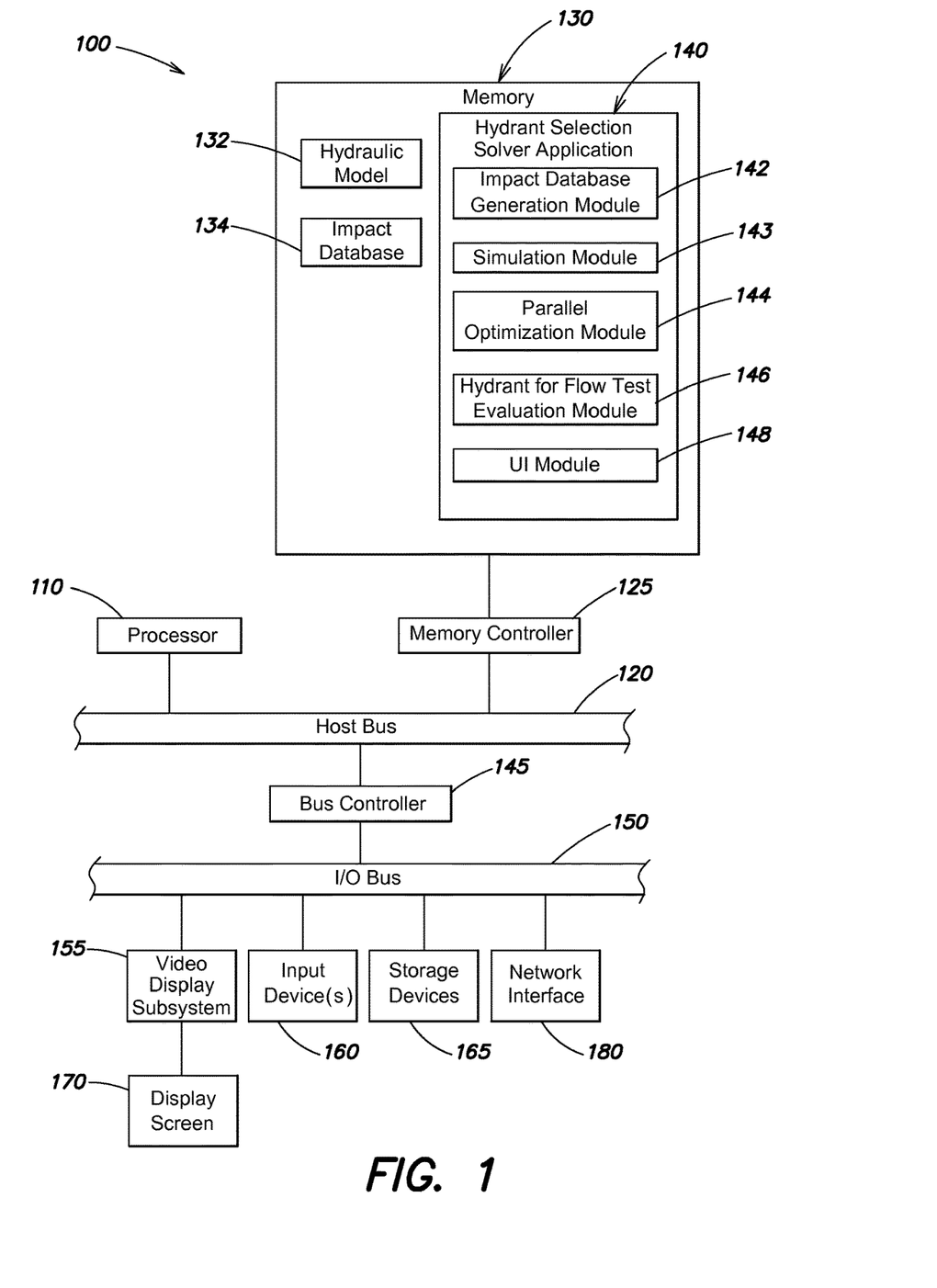
FIG. 1 is a block diagram of an example electronic device (e.g., a computer) that may be used with the present techniques.

FIG. 1 is a block diagram of an example electronic device 100 (e.g., a computer) that may be used with the present techniques. The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM) is also coupled to the host bus 120 via a memory controller 125. When in operation, the memory 130 stores processor-executable instructions and data that are provided to the processor 110. An input/output (I/O) bus 150 is accessible to the host bust 120 via a bus controller 145. A variety of additional components are coupled to the I/O bus 150. For example, a video display subsystem 155 is coupled to the I/O bus 150. The video display subsystem may include a display screen 170 and hardware to drive the display screen. At least one input device 160, such as a keyboard, a touch sensor, a touchpad, a mouse, etc., is also coupled to the I/O bus 150. A persistent storage device 165, such as a hard disk drive, a solid-state drive, or another type of persistent data store, is further attached, and may persistently store processor-executable instructions and data, that are loaded into the volatile memory 130 when needed. Still further, a network interface 180 is coupled to the I/O bus 150. The network interface enables communication over a computer network, such as the Internet, between the electronic device 100 and other electronic devices, using any of a number of well-known networking protocols. Such communication may enable collaborative, distributed, or remote computing with functionality spread across multiple electronic devices.

Working together, the components of the electronic device 100 (and other electronic devices in the case of collaborative, distributed, or remote computing) may execute instructions for a hydrant selection solver application 140 that may determine, for a user-supplied number of hydrants, an optimized set of hydrants for flow test using a two-part technique that include (1) building an impact database, and (2) using the impact database to search for the optimized set of hydrants. The hydrant selection solver application 140 may be structured as a single piece of software, or as a collection of software modules which exchange data and otherwise interoperate.

The hydrant selection solver application 140 may utilize pre-defined data, including a hydraulic model 132 of the water distribution system, as well as generate its own data, such as an impact database 134. The hydraulic model 132 may represent the water distribution system in terms of pipes that are interconnected at nodes. The pipes and nodes may be identified by respective identifiers (IDs). At least some of the nodes may coincide with the locations of hydrants. The impact database 134 may store an impact matrix (e.g., a binary matrix) that includes impact factors (e.g., binary values) that each indicate, for each of a plurality of hydrants, whether flow test at a corresponding hydrant has an impact on a corresponding pipe of the water distribution system. As explained in more detail below, impact may be evaluated based on increased flow velocity, hydraulic gradient change, or some other metric.

The hydrant selection solver application 140 may include modules, such as an impact database generation module 142, a simulation module 143, a parallel optimization module 144, a hydrant flow test evaluation module 146 and a user interface (UI) module 148. As discussed in more detail below, the impact database generation module 142 may build the impact database 134 by generating hydrant test events, causing the test events to be simulated by the simulation module 143, and calculating impact factors for each pipe of the water distribution system based on results of the simulation. The simulation module 143 may perform simulation runs using the hydraulic model 132 for the hydrant test events. In one embodiment, the simulation module 143 may be the WaterCAD® water distribution modeling and management solution available from Bentley Systems, Inc. of Exton, Pa. The parallel optimization module 144 may employ a genetic algorithm to determine candidate sets of hydrants for flow test, and evolve the candidate sets of hydrants based on fitness values, until an optimized set of hydrants for flow test are determined. In one implementation, the parallel optimization module 144 may be a generic optimization framework that implements a genetic algorithm, such as the Darwin Optimization Framework available from Bentley Systems Inc. of Exton Pa. The hydrant flow test evaluation module 146 may receive the candidate sets of hydrants from the parallel optimization module 144, and based on the impact database 134 (and the impact factors maintained therein), generate the fitness values used by the parallel optimization module 144. The fitness values may measure performance achieved by the hydrants of the candidate sets of hydrants. Performance may be measured based on a number, or a length, of pipes that would experience an increase in flow velocity greater than or equal to a prescribed minimum velocity change, that would experience a change in hydraulic gradient greater than or equal to a prescribed minimum hydraulic gradient change, or that would meet some other standard, in comparison to all pipes of the water distribution system. The UI module 148 may display a graphical UI on the display screen 170, in which a user may select parameters, and via which the user view results.

The analysis application 140, and its modules 142-148, may operate to solve a defined hydrant flow test optimization problem. Let $HY=\{hy_1, hy_2, \ldots, hy_{NH}\}$ be the set of available hydrants for flow test, where NH is the number of hydrants. Since a hydrant flow test is typically conducted by opening one hydrant at a time, using the hydraulic model 132 of the water distribution system, a hydrant flow test may be simulated by adding a nodal demand at the node where the hydrant is located, or by specifying an emitter coefficient at the node where the hydrant is located. Due to the increased demand at the hydrant node, the flow velocity is expected to change in the pipes that are connected with the flowing hydrant. Assume $v_{i,j}'$ and $hg_{i,j}'$ are the flow velocity and hydraulic gradient of pipe i while conducting a flow test at hydrant j, respectively, and $v_{i,j}$ and $hg_{i,j}$ are the flow velocity and hydraulic gradient of pipe i without a flow test. The performance of a hydrant flow test may be evaluated by computing the number of, or length of, the impacted pipes, where impact is evaluated as an increase in flow velocity greater than or equal to a prescribed minimum velocity change, a change in hydraulic gradient greater than or equal to a prescribed minimum hydraulic gradient change, or where some other standard is met.

Assuming that for NH hydrants, a hydrant set HY may be available for flow test. A test event, noted as event j of flowing hydrant j, may be represented with the hydraulic model 132 by adding the hydrant flow as an extra nodal demand to the node where the hydrant is located or directly connected. A simulation of event j resembles the flow test at hydrant j. The hydraulic simulation results for the flow test may be used to evaluate the impact of the corresponding hydrant. The impact may be represented by a binary impact factor $\lambda_{i,j}$, taking the value of either 1 or 0, which indicates effective or ineffective impact on pipe i by the hydrant j flow test. In one implementation, impact factors of hydrant flow test can be evaluated using flow velocity change, $\lambda_{i,j}$, as:

$$\lambda_{i,j} = \begin{cases} 1 & \text{if } \Delta v_{i,j} \geq \Delta v_{min} \\ 0 & \text{if } \Delta v_{i,j} < \Delta v_{min} \end{cases} \quad (1)$$

where $\Delta v_{i,j}$ is the flow velocity increase in pipe i under flow test j, and $\Delta v_{min}$ is the prescribed minimum velocity change. Alternatively, impact factors of hydrant flow test can be evaluated using the hydraulic gradient change, $\lambda_{i,j}$, as:

$$\lambda_{i,j} = \begin{cases} 1 & \text{if } \Delta hg_{i,j} \geq \Delta hg_{min} \\ 0 & \text{if } \Delta hg_{i,j} < \Delta hg_{min} \end{cases} \quad (2)$$

where $\Delta hg_{i,j}$ is the hydraulic gradient change in pipe i under flow test at hydrant j, i=1, ..., NP, j=1, ..., NH, and $\Delta hg_{min}$ is the prescribed minimum hydraulic gradient change. Simulating each of the NH flow test events will result in an impact matrix, given as:

$$\Lambda = [\lambda_{i,j}]_{NP \times NH} \quad (3)$$

Table 1 illustrates an example impact matrix. Each column represents the impact of one hydrant flow test on all the pipes while each row represents the impact of all the hydrants on one pipe.

TABLE 1

Impact factor matrix of hydrant flow test

|  | Hydrant-1 | Hydrant-2 | ... | Hydrant-NH |
|---|---|---|---|---|
| Pipe-1 | $\lambda_{1,1}$ | $\lambda_{1,2}$ | ... | $\lambda_{1,NH}$ |
| Pipe-2 | $\lambda_{2,1}$ | $\lambda_{2,2}$ | ... | $\lambda_{2,NH}$ |
| ... | ... | ... | ... | ... |
| Pipe-NP | $\lambda_{NP,1}$ | $\lambda_{NP,2}$ | ... | $\lambda_{NP,NH}$ |

The value of each element in Table 1 is an impact factor, and may be calculated by Eq. (1) or (2) after performing a hydraulic simulation on each of the hydrant tests.

It is common practice that just a handful of hydrants are selected for a flow test. Assume K (K<NH) hydrants are selected for a flow test from the hydrant set HY, and each of the selected set of hydrants is represented using its index in the set, noted as $\phi_k$, $1 \leq \phi_k \leq HK$, $k=1, \ldots, K$. The impact of hydrant $\phi_k$ on pipe i may be represented as $\lambda_{i,\phi_k}$. The impact of the K hydrants on pipe i is given as:

$$\Gamma_i = (\lambda_{i,\phi_1} \vee \lambda_{i,\phi_2} \vee \lambda_{i,\phi_3} \ldots \lambda_{i,\phi_k}) \quad (4)$$

Eq. (4) is a binary OR function, which results in a value of either 1 or 0 for pipe i. When F takes a value of 1, it indicates that at least one hydrant flow test induces greater than the prescribed flow velocity change or hydraulic gradient change, otherwise it is zero. Eq. (4) ensures that an impacted pipe is only accounted for once among all the flow tests conducted at the selected hydrants.

The performance of the selected set of K hydrants may be evaluated by the ratio of the length of the impacted pipes to the total length of the pipes, given as:

$$RT_{imp} = \frac{\sum_{i=1}^{NP}(L_i \times \Gamma_i)}{\sum_{i=1}^{NP}(L_i)} \quad (5)$$

Alternatively, the performance of the selected set of K hydrants may be evaluated by the ratio of the number of the impacted pipes to the total length of the pipes, evaluated using a similar expression.

In order to optimize the selection of the hydrants for flow test, it may be desirable to search for K specific hydrants so that the performance of the selected set of K hydrants is maximized. Therefore, the hydrant selection optimization problem may be formulated as:

Search for: $\Phi = \phi_1, \phi_2, \ldots, \phi_1) \in HY$ (6)

Maximize: $RT_{imp}$ (7)

Figure 2:
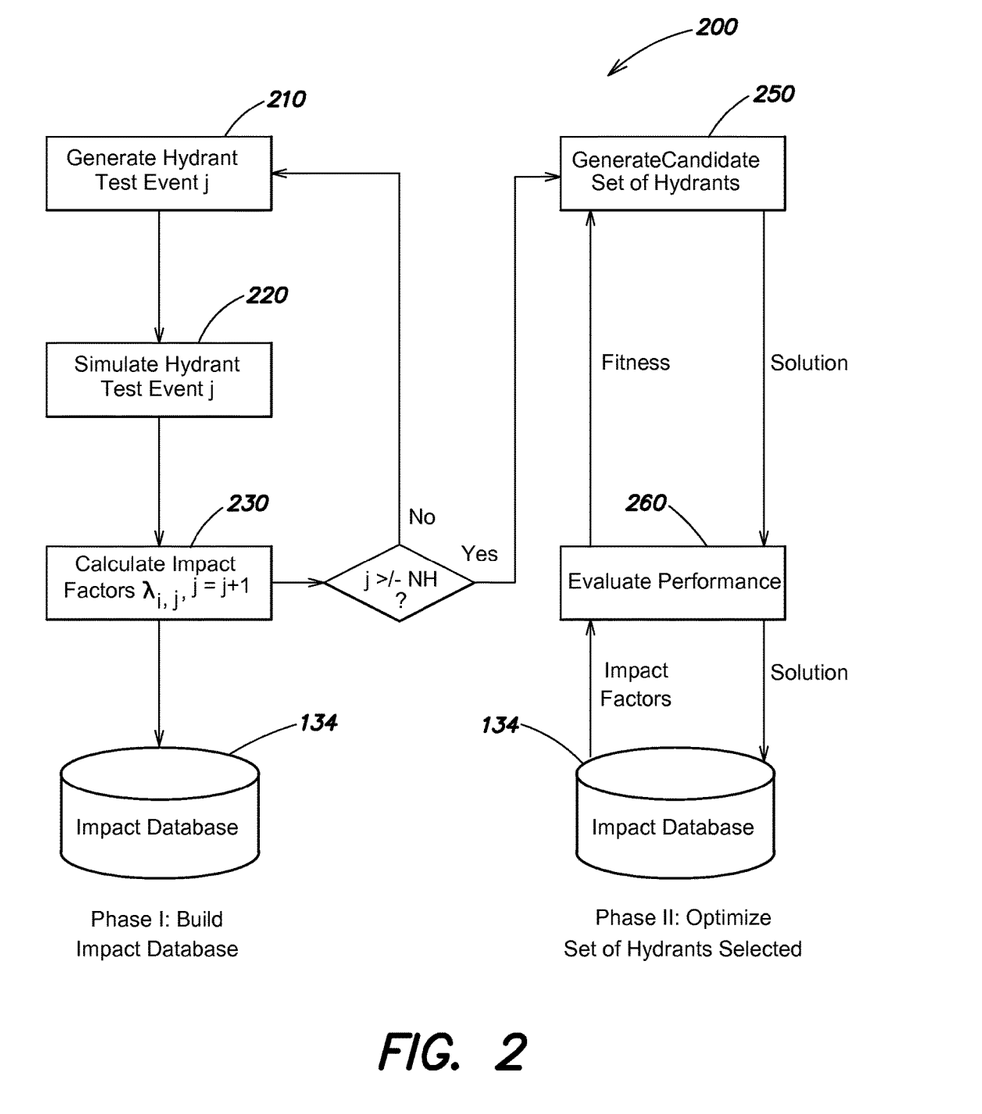
FIG. 2 is a flow diagram of an example sequence of steps for building an impact matrix (Phase I), and using the impact database to search for the optimized set of hydrants (Phase II)

The defined hydrant flow test optimization problem may be solved in two phases by the analysis application 140, and its modules 142-148. FIG. 2 is a flow diagram of an example sequence of steps 200 for building an impact matrix (Phase I) and using the impact database to search for the optimized set of hydrants (Phase II). The steps 200 may be implemented by the modules 142-148 of the hydrant selection solver application 140. In Phase I, at step 210, the impact database generation module 142 generates a hydrant test event j involving hydrants being opened for flow test. The test event may be indicated by either adding the hydrant flow as an extra nodal demand to the hydrant node, or adding an equivalent emitter coefficient to emulate a flowing hydrant. At step 220, the simulation module 143 simulates the hydrant test event j to determine hydraulic results, in particular pipe flow velocity increase and/or hydraulic gradient change, for each pipe in the water distribution system. At step 230, the impact database generation module 142 calculates impact factors, given by Eq. (1) and (2) for all pipes, and stores the impact factors in an impact matrix of the impact database 134. The impact matrix may be a binary matrix to minimize the file size of the impact database 134. At step 240, it is determined whether a hydrant test event j has been generated and simulated for each of the number of hydrants NH in the water distribution system. If not, execution may loop back to step 210. If so, execution may proceed to Phase II.

Figure 3:
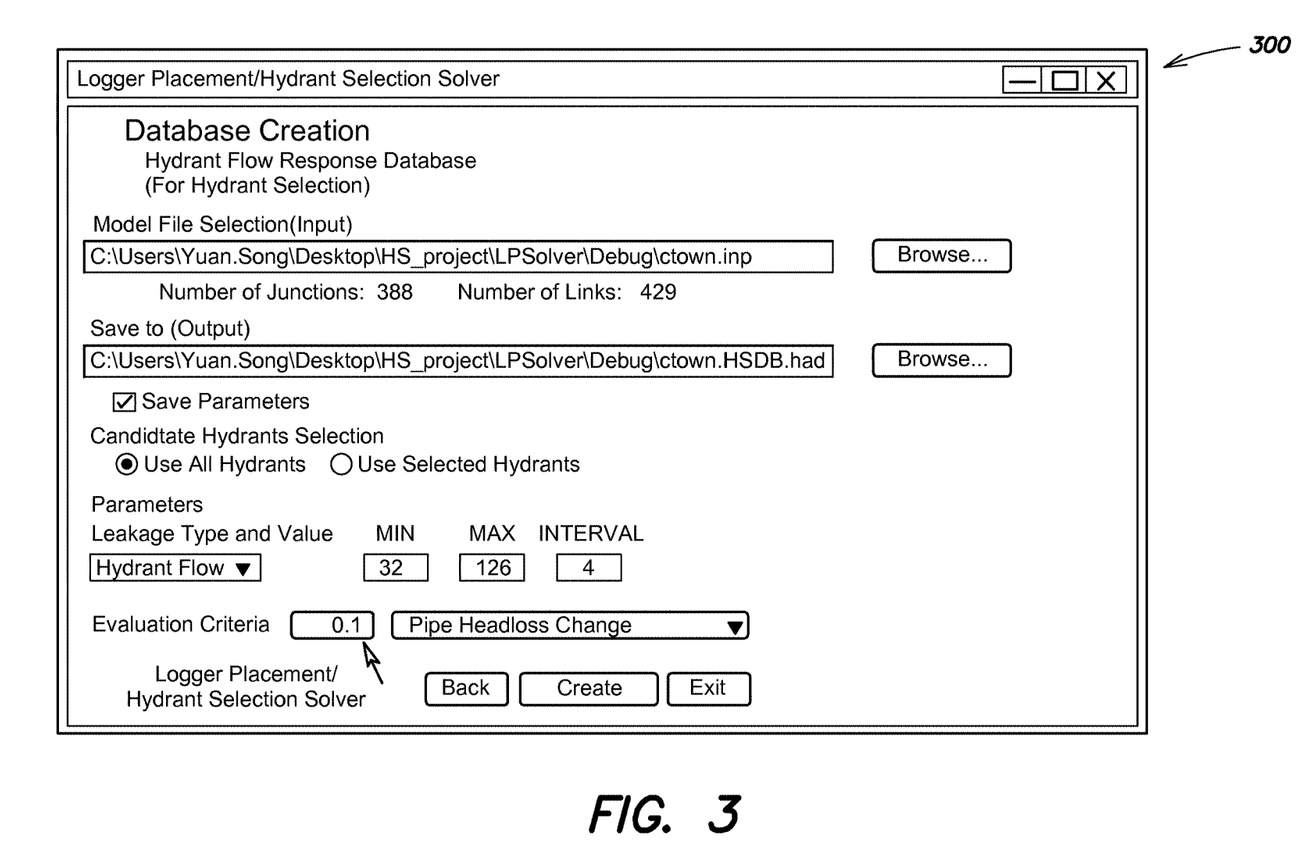
FIG. 3 is a screen shot of an example database creation user interface in which a user may select parameters related to an impact database.

FIG. 3 is a screen shot of an example database creation user interface 300, in which a user may select parameters related to the impact database 134. In the database creation user interface, the user may select the hydraulic model 132, define the scope of candidate hydrants, and set parameters such as the standard used to evaluate performance, including the prescribed minimum velocity change or prescribed minimum hydraulic gradient change.

Table 2 is an example of data that may be stored in an impact database 134 for an example water distribution system with three hydrants and four pipes. It should be understood that a practical water distribution system will generally include a far greater number of hydrants and pipes than this illustrative example. Assuming that each pipe has a same length of 1000 meters (m), the total length of pipes is 4000 m. Based on this example impact matrix, Hydrant-1 will have effective impact on Pipe-1, Pipe-3 and Pipe-4. Using Eq. (5) above, the performance of flow test involving Hydrant-1 may be calculated as 0.75 (75%). It may be observed that conducting flow test at Hydrant-1 and Hydrant-3 will have the same performance of 0.75 as Hydrant-1 only. This is because flow test at Hydrant-3 does not contribute any unique impact on the overall water distribution system. Although Pipe-1 and Pipe-4 are impacted by Hydrant-3, they are already accounted for by flow test at Hydrant-1. In contract, conducting additional flow test at Hydrant-2 will contribute a unique impact. As can be seen, conducting flow test at Hydrant-1 and Hydrant-2 will have an impact on all the pipes of the water distribution system, so that the performance may be calculated as 1.00 (100%).

TABLE 2

Example Impact Database

| | Hydrant-1 | Hydrant-2 | Hydrant-3 |
|---|---|---|---|
| Pipe-1 | 1 | 0 | 1 |
| Pipe-2 | 0 | 1 | 0 |
| Pipe-3 | 1 | 0 | 0 |
| Pipe-4 | 1 | 0 | 1 |

Figure 4:
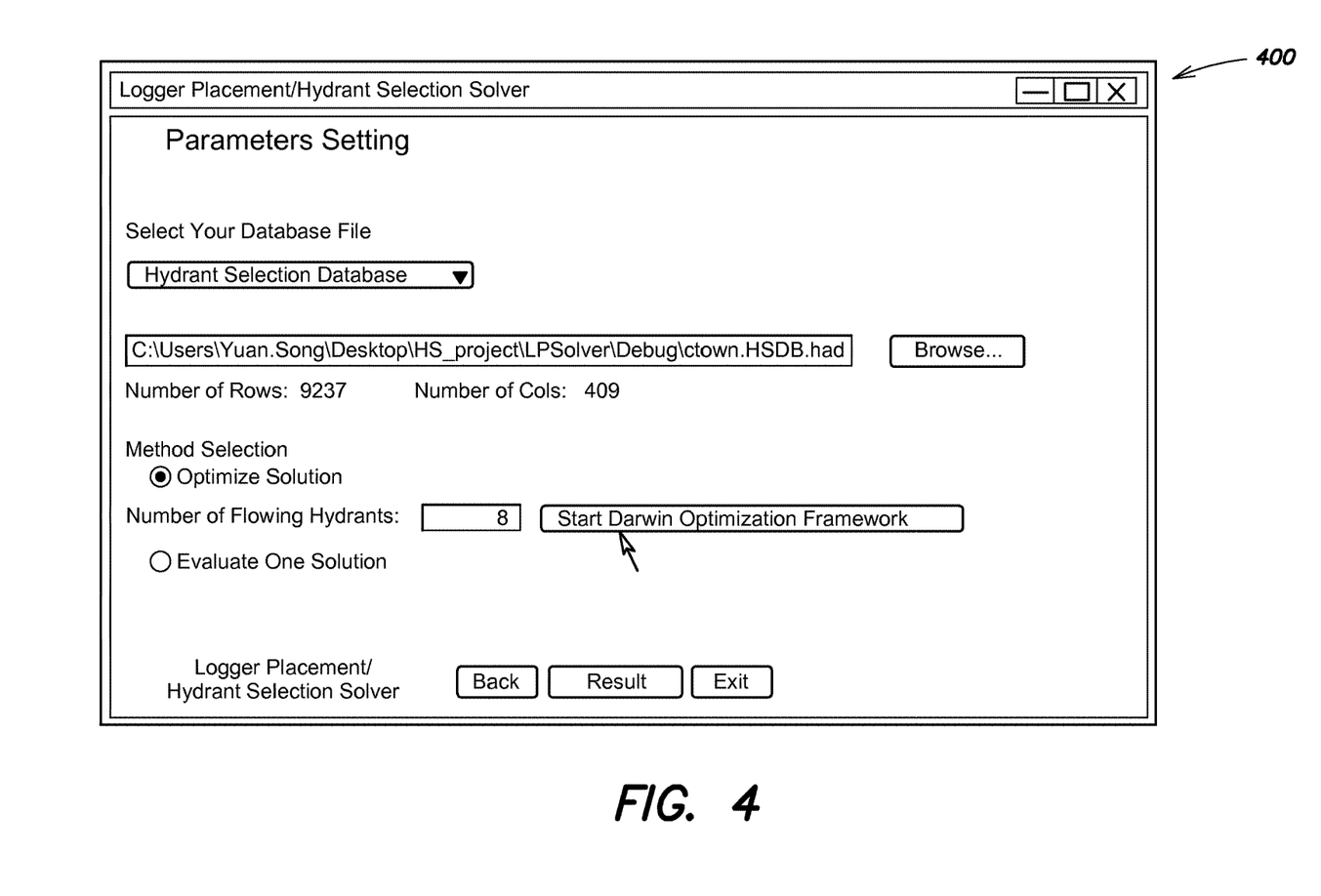
FIG. 4 is a screen shot of an example parameter setting user interface, illustrating user-entry of basic parameters for an optimization run.

In general, it is desirable to select a set of hydrants for flow test that maximize performance. Using the impact database 134, any combination of hydrants can be evaluated by using Eq. (5). FIG. 4 is a screen shot of an example parameter setting user interface 400, illustrating user-entry of basic parameters for an optimization run. Among other parameters, the user may specify the impact database 134 (from among potentially multiple impact databases for various projects), and the number hydrants K to be subject to flow test.

Returning to FIG. 2, in Phase II at step 250 the parallel optimization module 144 (e.g., the Darwin Optimization Framework) may generate candidate set of hydrants for flow test that includes the number hydrants K. This candidate set of hydrants represents a potential solution to the optimization problem. The candidate sets of hydrants (i.e. the potential solution) is passed to the hydrant flow test evaluation module 146 which, at step 260, evaluates performance of the candidate sets of hydrants using the impact database and Eq. (5) above. Performance is quantified by calculating a fitness value. The calculated fitness value may be passed back to the parallel optimization module 144. The parallel optimization module 144 may evolve the candidate set of hydrants based on the fitness value, to produce a subsequent candidate set of hydrants for flow test. The process of calculation and evolution may be iteratively repeated until a stopping criteria reached, to search for the combination of hydrants that maximizes performance.

Figure 5:
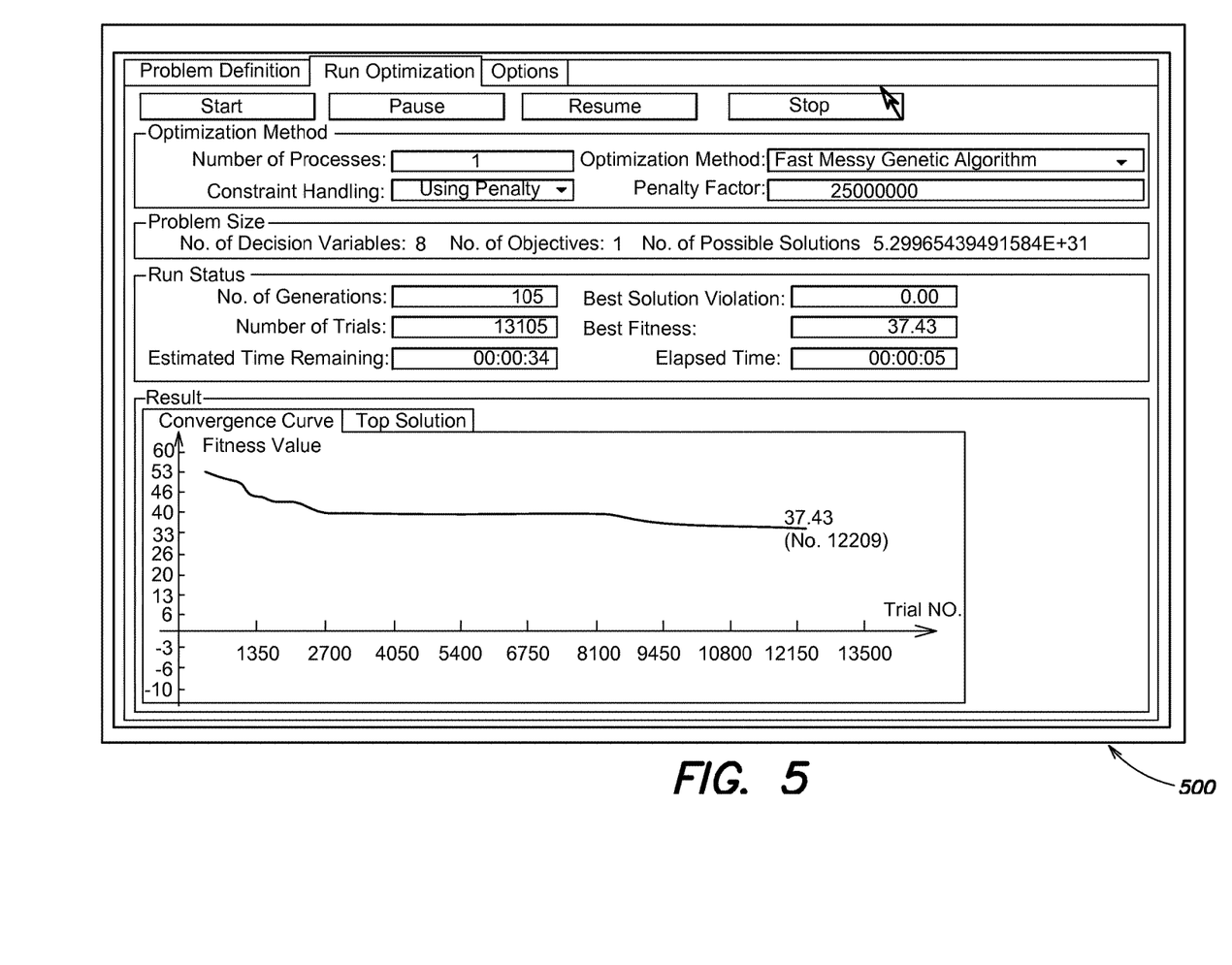
FIG. 5 is a screen shot of an example optimization run user interface, illustrating evolution of candidate sets of hydrants.

FIG. 5 is a screen shot of an example optimization run user interface 500, illustrating evolution of candidate sets of hydrants. Information regarding optimization run status, such as the number of generations (i.e. successive iterations of candidate sets of hydrants), the fitness value improvement, elapsed time and other optimization run parameters may be shown.

Figure 6:
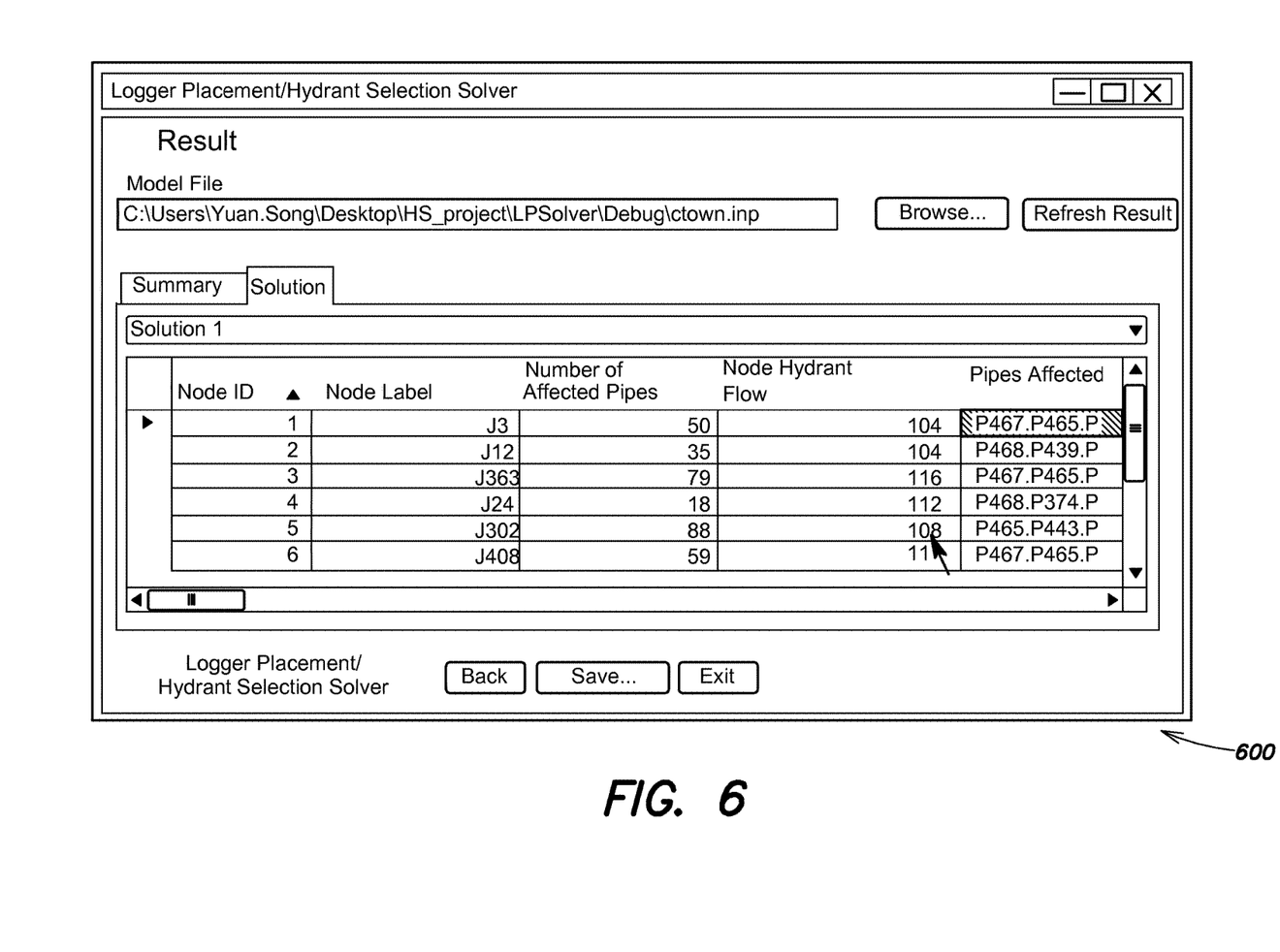
FIG. 6 is a screen shot of an example results user interface, illustrating presentation of an optimized set of hydrants for flow test.

FIG. 6 is a screen shot of an example results user interface 600, illustrating presentation of an optimized set of hydrants for flow test. The hydrants may be identified by, among other indicia, node ID. Further, indications of impact of flow test at each hydrant in the optimized set (including the number of pipes impacted, pipe ID of the pipes impacted, etc.) may be shown. Using this information, the user (or workers under the user's direction) may conduct an actual flow test at the hydrants.

The above described hydrant selection solver application 140 has been tested on the C-Town system Battle of the Water Calibration Network (BWCN) benchmark model. The system contains 5 District Metering Areas (DMAs) with 429 pipes, 5 pump stations and 7 tanks. As part of the field data provision, 8 hydrant flow tests were designed for collecting pressure data. Table 3 shows the hydrant junctions for the flow tests given by the BWCN benchmark model. Each of the flow tests was simulated by using the hydraulic model. The performance of the flow tests was evaluated by using the ratio of the impacted pipe length over the total pipe length, as given as Eq. (2), with the minimum hydraulic gradient (unit head loss) of 1.0 m/km. The total pipe length impacted by 8 hydrant tests is 18,270 meters, which represents about 32% of the overall pipe length of 56,387 meters.

Figure 7:
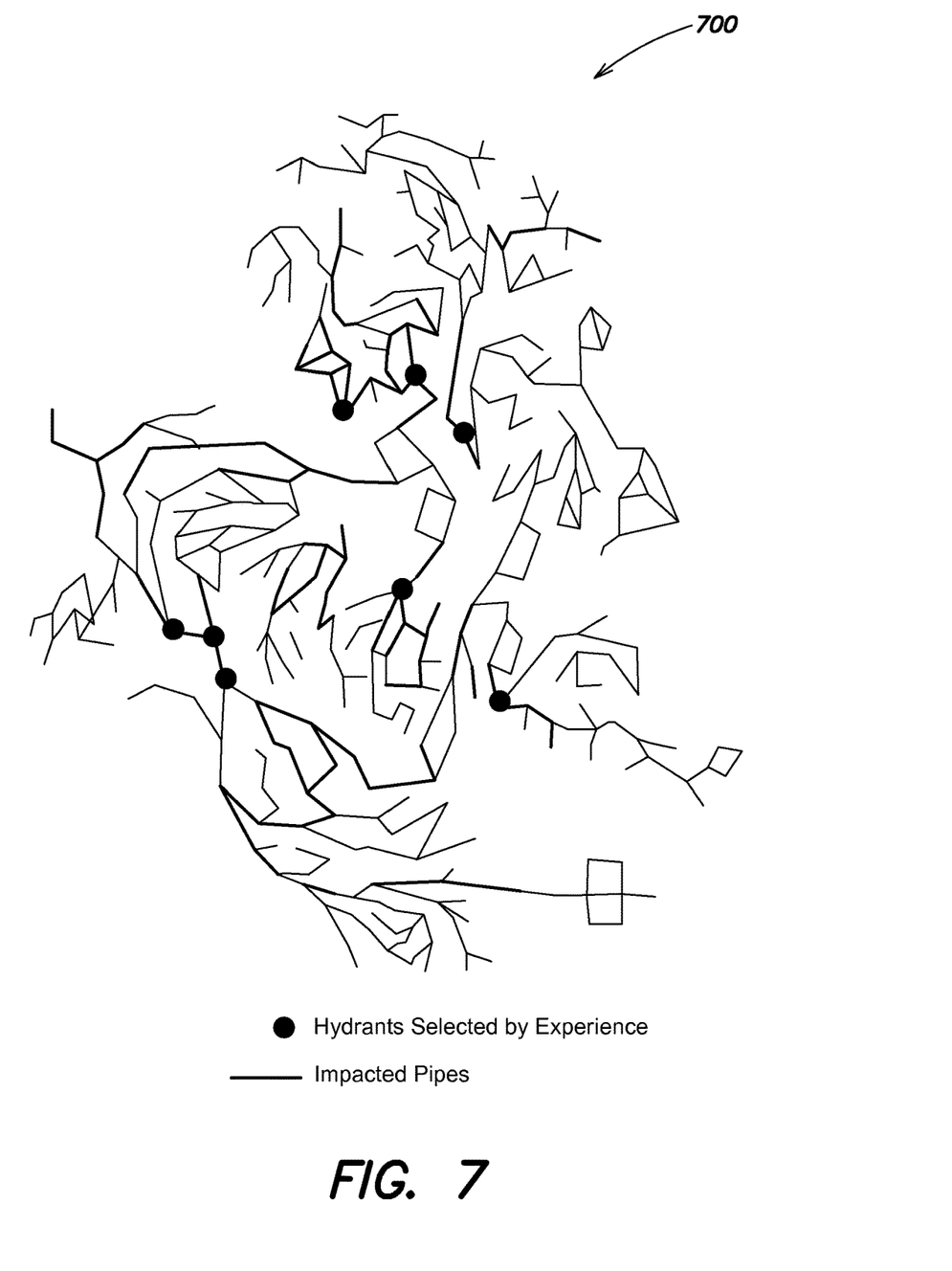
FIG. 7 is a diagram illustrating locations of hydrants selected manually, based on user experience, and the impacted pipes, for a test example.

FIG. 7 is a diagram 700 illustrating the locations of hydrants selected manually, based on user experience, and impacted pipes, for this example test. FIG. 7 may serve as a basis for comparison.

TABLE 3

Hydrant Flow Tests Designed by Experience

| Junction IDs | Hydrant Flow (lps) |
|---|---|
| J214 | 126 |
| J1056 | 126 |
| J411 | 126 |
| J234 | 63 |
| J238 | 63 |
| J1208 | 63 |
| J59 | 32 |
| J84 | 32 |

Due to the lack of hydrant information, it may be assumed that each junction is connected with a hydrant.

Figure 8:
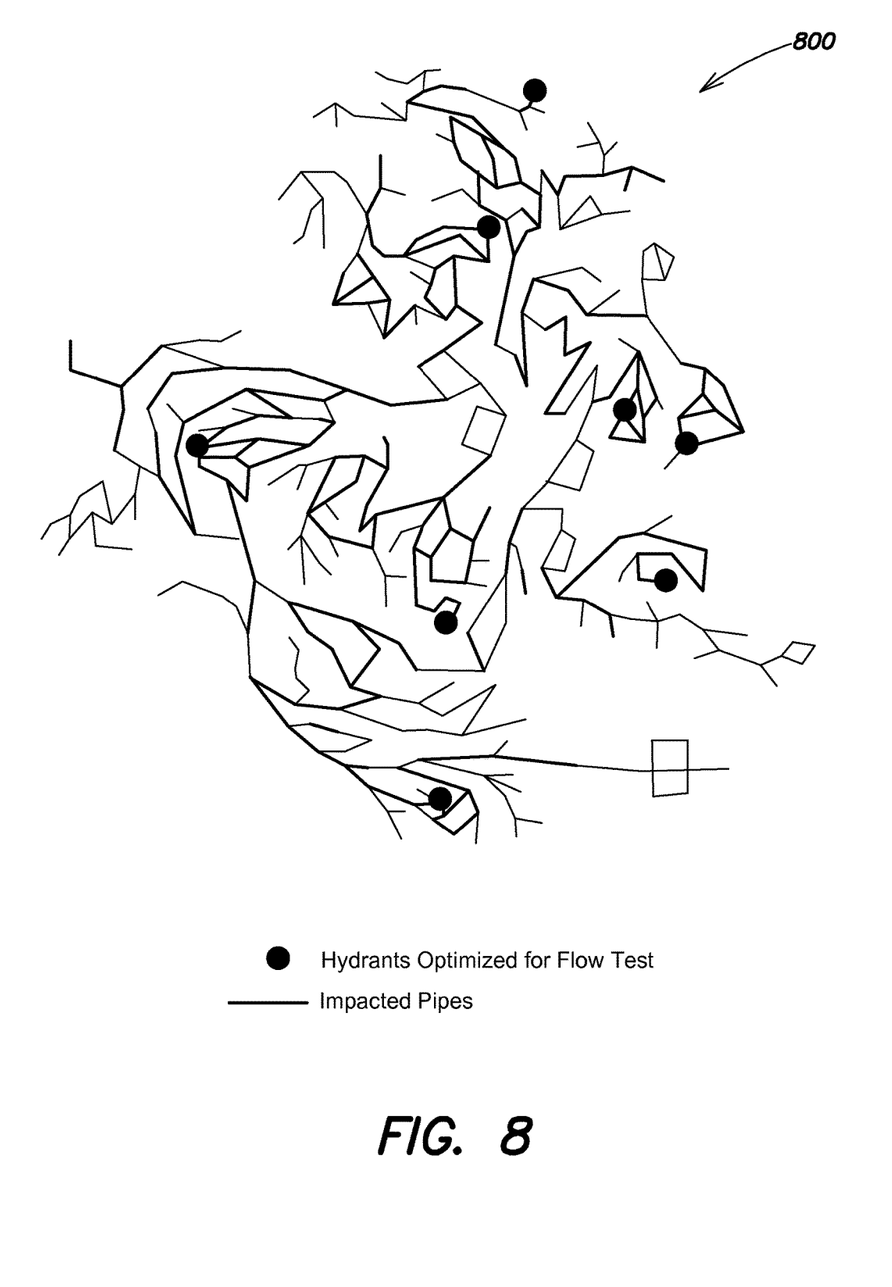
FIG. 8 is a diagram illustrating an optimized set of hydrants selected by a hydrant selection solver application for the same test example as FIG. 7.

Using the above described hydrant selection solver application 140, 8 optimized hydrants for flow tests are identified as shown. FIG. 8 is a diagram 800 illustrating an optimized set of hydrants selected by the hydrant selection solver application 140 for the same test example as FIG. 7. As can be seen, the hydrants selected by the hydrant selection solver application 140 are spread out in the water distribution system, and most of them are located at the edge of the system. The optimized hydrants result in an impacted pipe length ratio of 66%, which is more than double the impacted pipe ratio induced by flow tests designed manually based on user experience.

Figure 9:
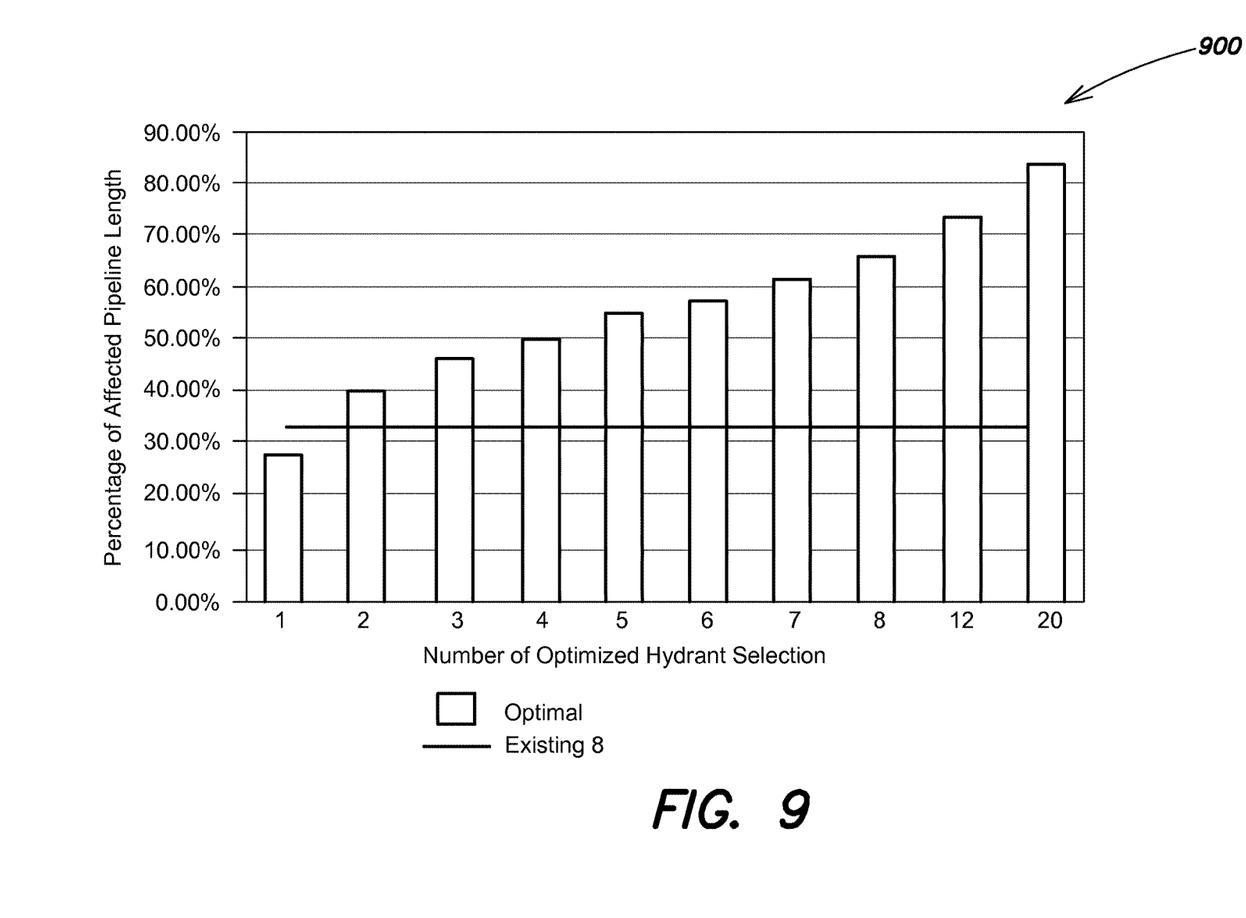
FIG. 9 is a diagram illustrating performance for differing numbers of selected hydrants.

The performance of the originally selected eight hydrants for flow test is also compared with the performances of optimized flow tests with different number of hydrants. FIG. 9 is a diagram 900 illustrating performance for differing numbers of selected hydrants. As shown in FIG. 9, two hydrants selected using the above described hydrant selection solver application 140 may outperform 8 hydrants selected using prior manual techniques. The more hydrants optimized for flow test, the greater the performance is, but it may be observed that the performance does not significantly improve when more than 20 hydrants are optimized for flow test for this example water distribution system.

In summary, the above described hydrant selection solver application may be used to optimize the selection of a set of hydrants for flow test. It should be understood that the techniques described in connection with the hydrant selection solver application 140, and portions, thereof may be utilized together, individually, or in combination with other techniques, depending on the implementation. Further, it should be understood that aspects of the techniques may be modified, added to, removed, or otherwise changed depending on the implementation. In general, it should be understood that the techniques may be implemented using a variety of different types of hardware, software, and combination thereof. Hardware may include a variety of types of processors, memory chips, programmable logic circuits, application specific integrated circuits, and/or other types of hardware components that support execution of software. Software may include executable instructions that implement applications stored in a non-transitory electronic device-readable medium, such as a volatile or persistent memory device, a hard-disk, or other data store. In conclusion, it should be understood that the above descriptions are meant to be taken only by way of example.

What is claimed is:

1. A method of optimizing selection of hydrants for flow test in a water distribution system, comprising:
   building an impact database that is stored on a non-transitory electronic device readable medium, the impact database to indicate whether a flow test at each hydrant in the water distribution system has an impact on each pipe of the water distribution system;
   receiving, by a hydrant selection solver application executing on the electronic device, a user-supplied number of hydrants to be subject to flow test;
   searching, by the hydrant selection solver application for an optimized set of hydrants for flow test that include the user-supplied number, the searching to include:
   generating a candidate set of hydrants for flow test,
   calculating a fitness value for the candidate set of hydrants for flow test using the impact database, the fitness value to evaluate performance of the candidate set of hydrants for flow test based on flow velocity or hydraulic gradient change in pipes,
   evolving the candidate set of hydrants based on the fitness value to produce a subsequent candidate set of hydrants for flow test, and
   iteratively repeating the calculating and evolving until a stopping criteria is reached to produce an optimized set of hydrants for flow test that maximizes the fitness value;
   displaying, by the hydrant selection solver application on a display screen on the electronic device, indications of the optimized set of hydrants; and
   conducting a flow test at each of the hydrants of the water distribution system indicated in the optimized set of hydrants from the hydrant selection solver application.

2. The method of claim 1, wherein the building further comprises:
   generating a plurality of hydrant test events;
   simulating each hydrant test event using a hydraulic model of the water distribution system to determine whether flow test at a hydrant has an impact on each pipe of the water distribution system; and
   storing impact factors in the impact database that each indicate whether flow test at a corresponding hydrant has an impact on a corresponding pipe of the water distribution system.

3. The method of claim 2, wherein the impact factors are binary values, and the impact database stores a binary matrix.

4. The method of claim 2, wherein the impact factors are each based on a flow velocity increase in the corresponding pipe meeting or exceeding a prescribed minimum velocity change.

5. The method of claim 2, wherein the impact factors are each based on a hydraulic gradient change in the corresponding pipe meeting or exceeding a prescribed minimum hydraulic gradient change.

6. The method of claim 1, wherein the generating and evolving are performed using a genetic algorithm.

7. The method of claim 1, wherein each fitness value is calculated based on a number of pipes impacted by increased flow velocity or increased hydraulic gradient change as a result of flow test.

8. The method of claim 7, wherein the each fitness value is calculated as the ratio of the number of pipes impacted by increased flow velocity or increased hydraulic gradient change as a result of flow test to a total number of pipes in the water distribution system.

9. The method of claim 1, wherein the each fitness value is calculated based on a length of pipes impacted by increased flow velocity or increased hydraulic gradient change as a result of flow test.

10. The method of claim 9, wherein the each fitness value is calculated as the ratio of the number of pipes impacted by increased flow velocity or increased hydraulic gradient change as a result of flow test to a total number of pipes in the water distribution system.

11. A method of optimizing selection of hydrants for flow test in a water distribution system, comprising:
    building an impact database that is stored on a non-transitory electronic device readable medium by
    generating a plurality of hydrant test events,
    simulating each hydrant test event using a hydraulic model of the water distribution system to determine whether flow test at a hydrant has an impact on each pipe of the water distribution system, and
    storing impact factors in the impact database that each indicate whether flow test at a corresponding hydrant has an impact on a corresponding pipe of the water distribution system, wherein the impact factors are each based on a flow velocity increase in the corresponding pipe meeting or exceeding a prescribed minimum velocity change or a hydraulic gradient change in the corresponding pipe meeting or exceeding a prescribed minimum hydraulic gradient change;

optimizing, by a hydrant selection solver application executing on an electronic device, selection of hydrants for flow test by generating a candidate set of hydrants for flow test, calculating a fitness value for the candidate set of hydrants for flow test based on the impact database, the fitness value to measure performance achieved by the hydrants of the candidate sets of hydrants, and generating a subsequent candidate set of hydrants for flow test using the fitness values, wherein the calculating and generating is iteratively repeated to maximize the fitness value, and a candidate set of hydrants for flow test that maximizes the fitness value is returned as the optimized set of hydrants for flow test, displaying, by the hydrant selection solver application on a display screen on the electronic device, indications of the optimized set of hydrants; and conducting a flow test at each of the hydrants of the water distribution system indicated in the optimized set of hydrants from the hydrant selection solver application.

12. The method of claim 11, wherein the impact factors are binary values, and the impact database stores a binary matrix.

13. The method of claim 11, wherein the each fitness value is calculated based on a number of pipes impacted by increased flow velocity or increased hydraulic gradient change as a result of flow test.

14. The method of claim 11, wherein the each fitness value is calculated based on a length of pipes impacted by increased flow velocity or increased hydraulic gradient change as a result of flow test.

* * * * *

UNITED STATES PATENT AND TRADEMARK OFFICE
CERTIFICATE OF CORRECTION

PATENT NO. : 10,060,835 B1
APPLICATION NO. : 14/808814
DATED : August 28, 2018
INVENTOR(S) : Zheng Yi Wu et al.

It is certified that error appears in the above-identified patent and that said Letters Patent is hereby corrected as shown below:

In the Specification

Column 6, Line 24 reads:
"either 1 or 0 for pipe $i$. When F takes a value of 1, it indicates"
Should read:
--either 1 or 0 for pipe $i$. When $\Gamma$ takes a value of 1, it indicates--

Column 8, Lines 14-15 reads:
"evolution may be iteratively repeated until a stopping cri-
teria reached, to search for the combination of hydrants that"
Should read:
--evolution may be iteratively repeated until a stopping cri-
teria is reached, to search for the combination of hydrants that--

Signed and Sealed this
Thirty-first Day of March, 2020

Andrei Iancu
*Director of the United States Patent and Trademark Office*